United States Patent
Uchida

(10) Patent No.: US 9,592,774 B2
(45) Date of Patent: Mar. 14, 2017

(54) WIRE HARNESS

(71) Applicant: YAZAKI CORPORATION, Minato-ku, Tokyo (JP)

(72) Inventor: Naonari Uchida, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/592,079

(22) Filed: Jan. 8, 2015

(65) Prior Publication Data

US 2015/0122545 A1 May 7, 2015

Related U.S. Application Data

(63) Continuation of application No. PCT/JP2013/068224, filed on Jul. 3, 2013.

(30) Foreign Application Priority Data

Jul. 12, 2012 (JP) ................... 2012-156419

(51) Int. Cl.
*B60R 16/02* (2006.01)
*H01B 7/00* (2006.01)
*H01B 1/02* (2006.01)
*H02G 3/04* (2006.01)

(52) U.S. Cl.
CPC ......... *B60R 16/0207* (2013.01); *H01B 1/023* (2013.01); *H01B 1/026* (2013.01); *H01B 7/0045* (2013.01); *H02G 3/04* (2013.01)

(58) Field of Classification Search
CPC .................................................. B60R 16/0207
USPC ....................................... 174/72 A
See application file for complete search history.

(56) References Cited

U.S. PATENT DOCUMENTS

2007/0221396 A1 9/2007 Izumida et al.
2008/0053682 A1* 3/2008 Victor ................... H01B 11/12
174/110 R

FOREIGN PATENT DOCUMENTS

| CN | 101169994 A | 4/2008 |
| CN | 201965954 U | 9/2011 |
| CN | 201965955 U | 9/2011 |
| EP | 2224457 A1 | 9/2010 |

(Continued)

OTHER PUBLICATIONS

The extended European search report issued on Jan. 25, 2016 in the counterpart European patent application.

(Continued)

*Primary Examiner* — Hoa C Nguyen
*Assistant Examiner* — Stanley Tso
(74) *Attorney, Agent, or Firm* — Mots Law, PLLC

(57) ABSTRACT

The wire harness according to the present invention comprises electric wires each including a conductor. The electric wire is configured of a low-current electric wire used for a power source circuit, a high-current/ground electric wire used for a high-current power source circuit or a ground circuit and allowing a larger current than that of the low-current electric wire to flow, and a signal electric wire used for a signal circuit. The low-current electric wire and the high-current/ground electric wire are formed of an aluminum electric wire in which the conductor is made of aluminum or an aluminum alloy. The signal electric wire is formed of a copper electric wire in which the conductor is made of copper or a copper alloy.

2 Claims, 2 Drawing Sheets

(56) References Cited

FOREIGN PATENT DOCUMENTS

| JP | 2000-357421 A | 12/2000 |
| JP | 2009-170177 A | 7/2009 |
| JP | 2009-170178 A | 7/2009 |
| JP | 2010-165605 A | 7/2010 |

OTHER PUBLICATIONS

The Chinese office action letter issued on Dec. 4, 2015 in the counterpart Chinese patent application.
The Japanese Office Action issued on Jun. 7, 2016 in the counterpart Japanese patent application.
The Chinese Office Action issued on May 17, 2016 in the counterpart Chinese patent application.
The Official Action issued on Nov. 1, 2016 in the counterpart Chinese patent application.

* cited by examiner ic
WIRE HARNESS

CROSS REFERENCE TO RELATED APPLICATIONS

This application is a Continuation of PCT Application No. PCT/JP2013/068224, filed on Jul. 3, 2013, and claims the priority of Japanese Patent Application No. 2012-156419, filed on Jul. 12, 2012, the content of both of which is incorporated herein by reference.

TECHNICAL FIELD

The present invention relates to a wire harness that is used for a vehicle.

BACKGROUND ART

Conventionally, from the viewpoint of improving a fuel consumption performance of vehicle such as an automobile, weight saving of a wire harness (W/H) that is configured of a group of a plurality of electric wires is required strongly. As the weight saving of a wire harness, weight saving of a conductor (core wire) itself of an electric wire to be used for the wire harness is examined. For example, a wire harness using an aluminum-based metal having a specific gravity that is lighter than that of a copper-based material (in particular, annealed copper material) as a material of the conductor of an electric wire is disclosed (for example, see Patent Literature 1).

Specifically, the electric wire is configured of a low-current electric wire used for a power source circuit, a high-current/ground electric wire used for a high-current power source circuit and a ground circuit and allowing a current larger than that of the first electric wire to flow, and a signal electric wire used for a signal circuit.

The low-current electric wire and the signal electric wire are formed of an aluminum electric wire in which the conductor is made of aluminum or an aluminum alloy and the high-current/ground electric wire is formed of a copper electric wire in which the conductor is made of copper or a copper alloy. Hereby, when comparing with the case where all the conductors of the low-current electric wire, the high-current/ground electric wire and the signal electric wire are formed of a copper electric wire, weight saving can be achieved.

CITATION LIST

Patent Literature

Patent Literature 1: Japanese Patent Laid-Open Publication No. 2009-170178

SUMMARY OF INVENTION

Technical Problem

However, in the above-described conventional wire harness, in order to adjust a conductive resistance of an aluminum electric wire to meet with that of a copper electric wire, it was necessary to make an outer diameter of the aluminum electric wire larger. Consequently, although it was effective for weight saving of a wire harness, diameter reduction of a wire harness itself was limited, and there was a room for improvement in satisfying both weight saving and size reduction of a wire harness under the present conditions.

Consequently, the present invention aims to provide a wire harness that can satisfy both weight saving and size reduction.

Solution to Problem

In order to solve the problem, the present invention has following features. First, a first feature of the present invention has such a gist as being a wire harness (wire harness 1) comprising electric wires (electric wire 10) each including a conductor (conductor 11), the electric wire including a first electric wire (low-current electric wire 10A) used for a power source circuit, a second electric wire (high-current/ground electric wire 10B) used for a high-current power source circuit or a ground circuit and allowing a current larger than that of the first electric wire to flow, and a signal electric wire used for a signal circuit (signal electric wire 10C), wherein the first electric wire and the second electric wire are formed of an aluminum electric wire in which the conductor is made of aluminum or an aluminum alloy, and the signal electric wire is formed of a copper electric wire in which the conductor is made of copper or a copper alloy.

According to such feature, the first electric wire and second electric wire are formed of an aluminum electric wire, and the signal electric wire is formed of a copper electric wire. The inventors focused on weight saving for the first electric wire and the second electric wire that were generally thicker than the signal electric wire, and focused on diameter reduction for the signal electric wire that was thinner than the first electric wire and the second electric wire.

That is, by forming the first electric wire and the second electric wire by an aluminum electric wire, as compared with the case where the each of electric wires is formed of a copper electric wire, the weight saving of each of electric wires can be achieved even when outer diameters of each of electric wires become larger. On the other hand, by forming the signal electric wire by a copper electric wire, as compared with the case where the signal electric wire is formed of an aluminum electric wire, the outer diameter of the signal electric wire can be made thinner (so-called diameter reduction).

As such, by saving the weight of the first electric wire and the second electric wire and reducing the diameter of the signal electric wire, and by using the first electric wire and the second electric wire even resulted to have larger outer diameters and the signal electric wire with a reduced diameter simultaneously, the increase in the outer diameter of the wire harness itself can be suppressed while enhancing the weight saving of the whole wire harness. Accordingly, both the weight saving and size reduction of the wire harness can be satisfied.

The second feature of the present invention have such a gist as being the wire harness according to the first feature of the present invention, wherein a cross-sectional area of the conductor of the first electric wire is from 0.35 $mm^2$ to 2.5 $mm^2$ and a cross-sectional area of the conductor of the signal electric wire is from 0.13 $mm^2$ to 0.35 $mm^2$, the first electric wire and the signal electric wire are used in the case where the conductor would have a cross-sectional area in a range from 0.35 $mm^2$ to 1.25 $mm^2$ if the conductor were formed of copper or a copper alloy.

DESCRIPTION OF EMBODIMENTS

Figure 1A:
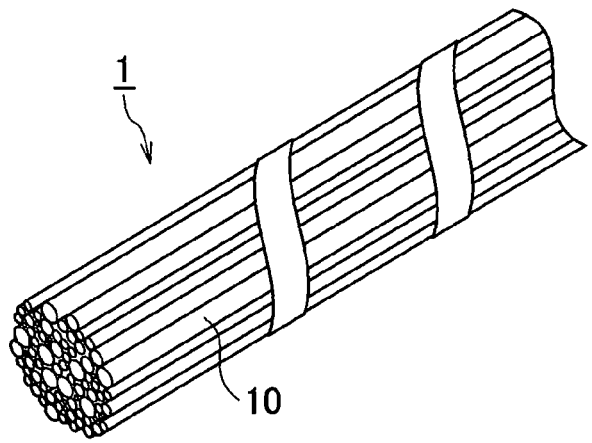
FIG. 1A is a perspective view showing the wire harness according to the present embodiment.

Next, the embodiment of the wire harness according to the present invention will be explained while referring to the drawings. Meanwhile, in the description of the following drawings, the same or similar reference sings are given to the same or similar portions. However, it is to be minded that the drawings are schematic and the ratio of respective dimensions, etc. are different from actual ones. Accordingly, a specific dimension etc. should be decided while considering the following explanation. Further, between drawings with each other, too, portions in which each other's relation of dimensions and ratios are different may be included.

(Configuration of Wire Harness)

First, the configuration of a wire harness 1 according to the present embodiment will be explained while referring to the drawings. FIG. 1A is a perspective view showing the wire harness 1 according to the present embodiment, FIG. 1B is a cross-sectional view showing the wire harness 1 according to the present embodiment, and FIG. 1C is an enlarged drawing of A in FIG. 1B.

Figure 1B:
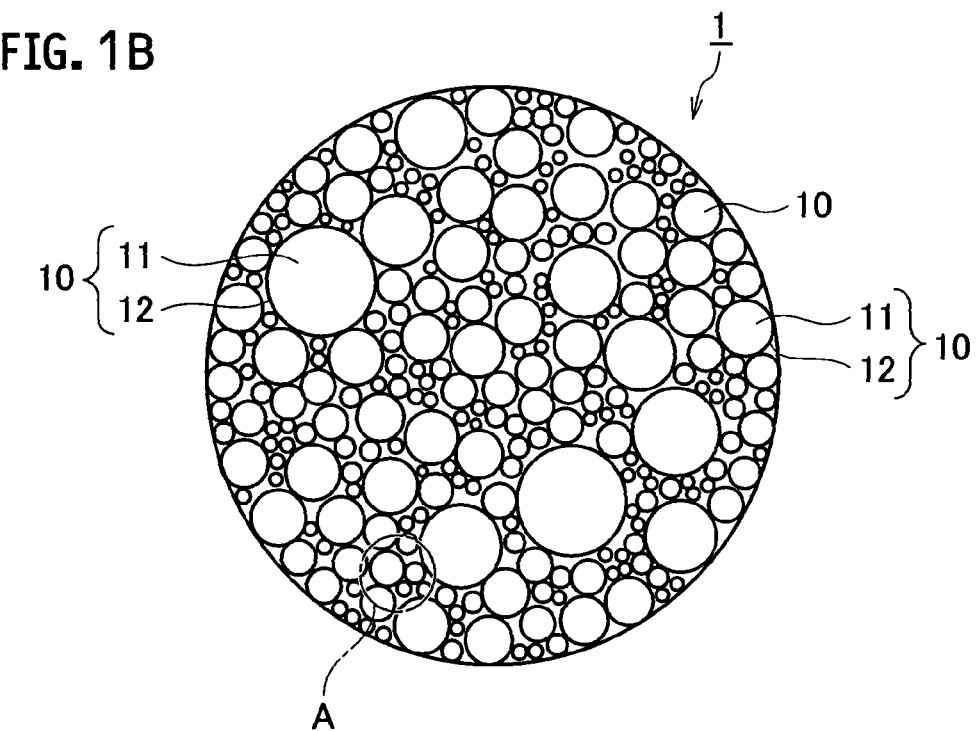
FIG. 1B is a cross-sectional view showing the wire harness according to the present embodiment.

As shown in FIGS. 1A and 1B, the wire harness 1 is one in which electric wires 10 (10A, 10B, 10C), which are configured by covering conductors 11 (11A, 11B, 11C) having cross-sectional area of the conductors that are different from each other with insulating covering materials 12 (12A, 12B, 12C), are bundled in plural number. Meanwhile, the wire harness 1 is routed to a vehicle such as an automobile and is used, for example, as an instrument panel harness, a floor harness, an engine room harness, a roof harness, a door harness, etc.

The electric wire 10 is roughly configured of a low-current electric wire 10A as a first electric wire used for a power source circuit, a high-current/ground electric wire 10B as a second electric wire used for a high-current power source circuit or a ground circuit and allowing a current larger than that of the low-current electric wire 10A to flow, and a signal electric wire 10C used for a signal circuit.

Figure 1C:
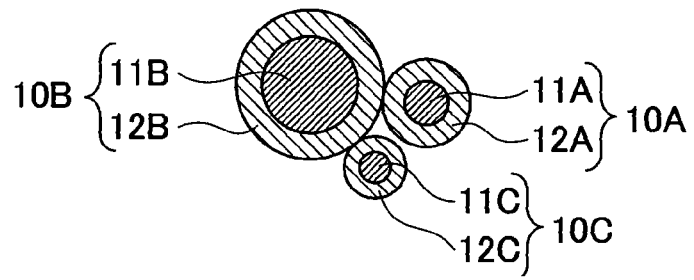
FIG. 1C is a drawing of an enlarged A portion in FIG. 1B.

The low-current electric wire 10A is formed, as shown in FIG. 1C, by covering a conductor 11A with a covering material 12A. The low-current electric wire 10A is formed of an aluminum electric wire in which the conductor 11A is made of aluminum or an aluminum alloy.

The high-current/ground electric wire 10B is formed, as shown in FIG. 1C, by covering a conductor 11B with a covering material 12B. The high-current/ground electric wire 10B is formed, in the same way as in the low-current electric wire 10A, of an aluminum electric wire in which the conductor 11 B is made of aluminum or an aluminum alloy.

The signal electric wire 10C is formed, as shown in FIG. 1C, by covering a conductor 11C with a covering material 12C. The signal electric wire 10C is formed of a copper electric wire in which the conductor 11C is made of copper or a copper alloy.

Meanwhile, the wire harness 1 shown in FIGS. 1A and 1B is prepared for making the explanation easy, and thus may be different from the wire harness 1 that is practically used and should have from at least two to several hundreds of electric wires 10.

In such a wire harness 1, in the case where the entire electric wire is formed of copper or a copper alloy, the most of electric wires 10 (for example, in 80% of the whole) has a conductor with its cross-sectional area being in a range from 0.35 $mm^2$ to 1.25 $mm^2$.

Examples of the other electric wires include the high-current/ground electric wire 10B in which a cross-sectional area of the conductor is more than 1.25 $mm^2$ to around 8 $mm^2$ (including 8 $mm^2$ and more). These high-current/ground electric wires 10B are formed, as described above, of an aluminum electric wire made of aluminum or an aluminum alloy.

That is, the above-described low-current electric wire 10A and the signal electric wire 10C are assumed to be the electric wires using a conductor of its cross-sectional area ranging from 0.35 $mm^2$ to 1.25 $mm^2$ in the case where the conductor 11 (conductor 11A and conductor 11C) is formed of copper or a copper alloy.

In the present embodiment, the low-current electric wire 10A is formed of an aluminum electric wire in which the conductor is made of aluminum or an aluminum alloy having a cross-sectional area of from 0.35 $mm^2$ to 2.5 $mm^2$. That is, as for the low-current electric wire 10A, in the case where the conductor 11A formed of copper or a copper alloy and having a cross-sectional area of the conductor ranging from 0.35 $mm^2$ to 1.25 $mm^2$ is used, an aluminum electric wire is used instead of a copper electric wire.

On the other hand, the signal electric wire 10C is formed of a copper electric wire in which the conductor is made of copper or a copper alloy having a cross-sectional area of from 0.13 $mm^2$ to 0.35 $mm^2$. That is, as for the signal electric wire 10C, in the case where the conductor 11C formed of copper or a copper alloy and having a cross-sectional area ranging from 0.35 $mm^2$ to 1.25 $mm^2$ is used, a copper electric wire is used instead of an aluminum electric wire.

Meanwhile, the high-current/ground electric wire 10B is assumed to be the electric wire using a conductor of its cross-sectional area ranging from 2 $mm^2$ to 5 $mm^2$ in the case where the conductor 11 (conductor 11B) is formed of copper or a copper alloy. In the present embodiment, the high-current/ground electric wire 10B is formed of an aluminum electric wire in which the conductor is made of aluminum or an aluminum alloy having a cross-sectional area of from 2.5 $mm^2$ to 8 $mm^2$.

(Comparative Evaluation)

Figure 2:
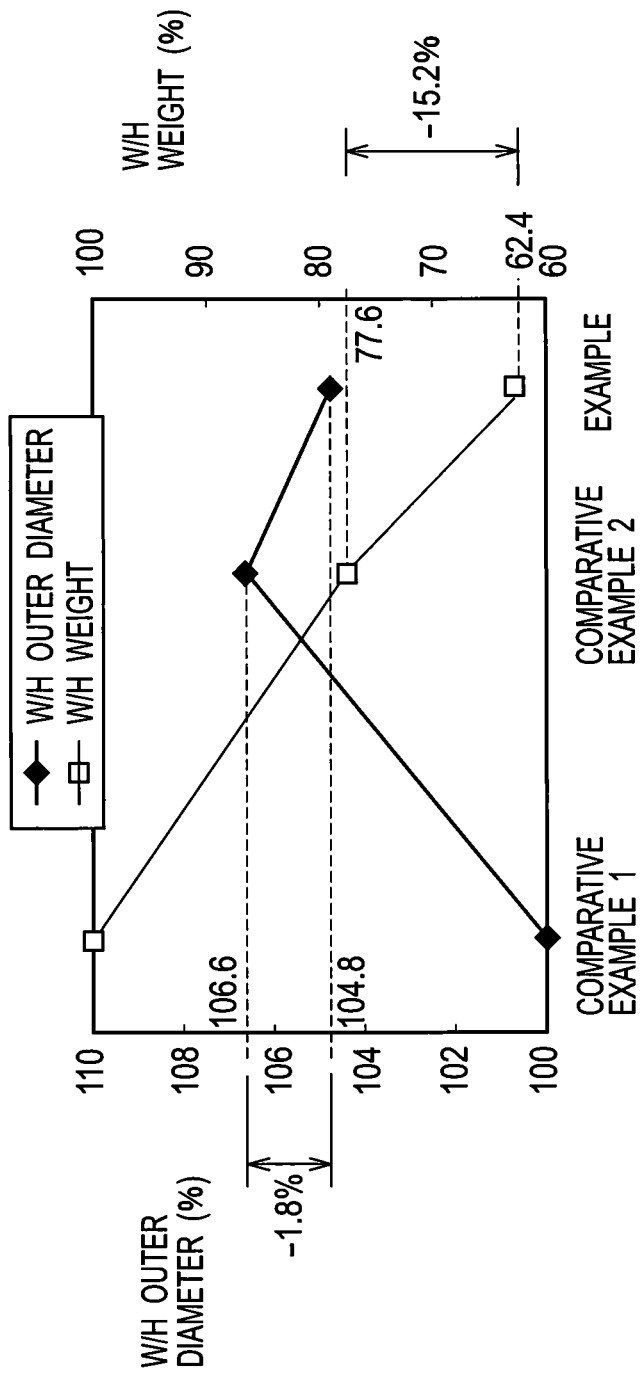
FIG. 2 is a graph showing the outer diameter and weight of the wire harness.

Next, comparative evaluations of a plural kinds of wire harnesses will be explained while referring to Table 1 and FIG. 2. Table 1 is a table showing features of constituting electric wires (cross-sectional area of the conductor and the number of constituting electric wires) for wire harnesses according to Comparative Examples 1 and 2 and Example, and FIG. 2 is a graph showing the outer diameter and weight of wire harnesses (W/H). The graph shown in FIG. 2 is a graph in which the outer diameter and weight are plotted for wire harnesses according to Comparative Examples 1 and 2 and Example shown in Table 1.

TABLE 1

| | Low-current electric Wire | Signal electric wire | High-current/ground electric wire, etc. | Outer diameter | Weight |
|---|---|---|---|---|---|
| Comparative Example 1 | Copper electric wire: 0.35 to 2 mm² × 97 | Copper electric wire: 0.35 to 1.25 mm² × 116 | Copper electric wire: 2 to 5 mm² × 16 | 100 | 100 |
| Comparative Example 2 | Aluminum electric wire: 0.75 to 1.25 mm² × 46, Copper electric wire: 0.35 to 1.25 mm² × 51 | Copper electric wire (TASO): 0.13 to 0.35 mm² × 116 | Aluminum electric wire: 2.5 to 8 mm² × 16 | 106.6 | 77.6 |
| Example (present invention) | Aluminum electric wire 0.5 to 1.25 mm² × 97 | Copper electric wire (ISO): 0.13 to 0.35 mm² × 116 | Aluminum electric wire: 2.5 to 8 mm² × 16 | 104.8 | 62.4 |

As shown in Table 1, the wire harness according to Comparative Example 1 is formed of copper electric wires in which all of the conductors of a plural number of electric wires (that is, low-current electric wire, high-current/ground electric wire and signal electric wire) are made of copper or a copper alloy.

Further, in the wire harness according to Comparative Example 2, the low-current electric wire is formed of an aluminum electric wire made of aluminum or an aluminum alloy and of a copper electric wire made of copper or a copper alloy, the high-current/ground electric wire is formed of an aluminum electric wire made of aluminum or an aluminum alloy, and the signal electric wire is formed of a copper electric wire made of copper or a copper alloy.

Furthermore, in the wire harness 1 according to Example, in the same way as the above-described embodiment, the low-current electric wire and the high-current/ground electric wire are formed of an aluminum electric wire made of aluminum or an aluminum alloy, and the signal electric wire is formed of a copper electric wire made of copper or a copper alloy.

As shown in Table 1 and FIG. 2, for the wire harness 1 according to Example, as compared with wire harnesses according to Comparative Examples 1 and 2, the weight saving of the electric wire is expected by using an aluminum electric wire for the low-current electric wire 10A and the high-current/ground electric wire 10B. In this case, the aluminum electric wire is lightweight, but on the other hand, has a lower conductivity of about 60% compared to that of a copper electric wire, and therefore, it is necessary to make an outer diameter of the conductor larger than that of a copper electric wire.

Specifically, in order to adjust a conductor resistance to meet with that of a copper electric wire, an aluminum electric wire must have an outer diameter of about 1.7 times as that of the copper electric wire. For example, when setting the conductor of a copper electric wire as "1", the conductor of an aluminum electric wire is set as "1.7" for comparison, and the aluminum electric wire has half a weight compared to the copper electric wire per 1 m. Meanwhile, when comparing these as electric wires, the weight of the aluminum electric wire is saved by about 30% compared to the copper electric wire. In addition, by reducing the diameter of the conductor used for the signal electric wire, the weight is saved by about 46%.

As such, in the wire harness 1 according to Example, even when the outer diameter of the aluminum electric wire becomes large, the increase in the outer diameter of a wire harness can be suppressed as compared with the wire harness according to Comparative Example 2 by the simultaneous use of the signal electric wire in which the diameter has been reduced.

That is, as shown in Table 1 and FIG. 2, it became clear that the wire harness 1 according to Example could suppress the outer diameter by about 1.8% and save the weight by about 15.2% as compared with the wire harness according to Comparative Example 2, when defining the outer diameter and the weight of the wire harness according to Comparative Example 1 as "100."

(Function/Effect)

In the embodiment as explained above, the low-current electric wire 10A and the high-current/ground electric wire 10B are formed of an aluminum electric wire and the signal electric wire 10C is formed of a copper electric wire. The inventors focused on weight saving for the low-current electric wire 10A and the high-current/ground electric wire 10B that were generally thicker than the signal electric wire 10C, and focused on diameter reduction for the signal electric wire 10C that was thinner than the low-current electric wire 10A.

That is, by forming the low-current electric wire 10A and the high-current/ground electric wire 10B by an aluminum electric wire, as compared with the case where the low-current electric wire 10A is formed of a copper electric wire, the weight saving of each of electric wires 10A, 10B can be achieved even when outer diameters of each of electric wires 10A, 10B is larger. On the other hand, by forming the signal electric wire by a copper electric wire, as compared with the case where the signal electric wire 10C is formed of an aluminum electric wire, the outer diameter of the signal electric wire 10C can be made thinner (so-called diameter reduction).

As described above, by saving the weight of the low-current electric wire 10A and the high-current/ground electric wire 10B and reducing the diameter of the signal electric wire 10C, and by using the low-current electric wire 10A and the high-current/ground electric wire 10B even resulted to have larger outer diameters and the signal electric wire 10C with a reduced diameter simultaneously, the increase in the outer diameter of the wire harness 1 itself can be suppressed while enhancing the weight saving of the whole wire harness 1. Accordingly, both the weight saving and size reduction of the wire harness 1 can be satisfied.

In the embodiment, the low-current electric wire 10A and the signal electric wire 10C are used in the case where the conductor 11 (conductor 11A and conductor 11C) would have a cross-sectional area in a range from 0.35 mm² to 1.25 mm² if the conductor 11 were formed of copper or a copper alloy. In this case, a cross-sectional area of the conductor of the low-current electric wire 10A is from 0.35 mm² to 2.5 mm² and a cross-sectional area of the signal electric wire 10C is from 0.13 mm² to 0.35 mm². Hereby, it is most suitable for the weight saving and size reduction of the wire harness 1. In particular, when the cross-sectional area of the conductor of the low-current electric wire 10A is 0.5 mm², it becomes more effective for the weight saving and size reduction of the wire harness 1.

(Other Embodiments)

As described above, the content of the present invention has been disclosed through the embodiment of the present invention, but it should not be so understood that the statement and drawings configuring a part of the disclosure limit the present invention. From the disclosure, various alternative forms for practice, Examples and operational techniques become clear for a person skilled in the art.

For example, the embodiment of the present invention can be changed as follows. Specifically, the wire harness 1 is not necessarily to be routed to a vehicle such as an automobile, but may be applied to an object that expects weight saving.

Further, in the wire harness 1, it is not necessarily meant that a majority of the electric wires 10 should have a conductor with a cross-sectional area ranging from 0.35 mm² to 1.25 mm², but it is also applicable to the case where the majority of the conductors have cross-sectional areas of other sizes.

Further, the electric wire 10 of the wire harness 1 has been explained mainly, but, for example, in conformance with Japanese Automotive Standards Organization (JASO standard) or the standard of International Organization for Standardization (ISO standard), the thickness of the covering material 12 may be varied based on the cross-sectional area of the conductor of the electric wire 10.

As such, needless to say, the present invention includes various forms of practice and the like that are not described here. Accordingly, the scope of the present invention is defined only by the matter specifying the invention according to the claims that are reasonable from the above-described explanation.

INDUSTRIAL APPLICABILITY

According to the features of the present invention, a wire harness that can satisfy both the weight saving and size reduction can be provided.

REFERENCE SIGNS LIST

1 wire harness
10 electric wire
10A low-current electric wire (first electric wire)
10B high-current/ground electric wire (second electric wire)
10C signal electric wire
11, 11A, 11B, 11C conductor
12, 12A, 12B, 12C covering material

The invention claimed is:

1. A wire harness comprising:
electric wires each including a conductor;
the electric wires including a first electric wire to be coupled to a power source circuit, a second electric wire to be coupled to a high-current power source circuit or a ground circuit and allowing a current larger than a current of the first electric wire to flow, and a signal electric wire to be coupled to a signal circuit, wherein
the conductor of each of the first electric wire and the second electric wire comprises an aluminum electric wire made of aluminum or an aluminum alloy so as to comprise a reduced weight thereof as compared to a construction in which a conductor of at least one of the first electric wire or the second electric wire is made of copper or a copper alloy; and
the conductor of the signal electric wire comprises a copper electric wire made of copper or a copper alloy comprising a reduced diameter as compared to a construction in which the signal wire comprises an aluminum electric wire, wherein
a cross-sectional area of the conductor of the first electric wire and a cross-sectional area of the conductor of the second electric wire are set so as to comprise:
an increased conductor resistance of the first electric wire and the second electric wire to meet a conductor resistance of a copper electric wire by setting an outer diameter of the first electric wire and the second electric wire to 1.7 times that of the copper electric wire;
a reduced weight of a combination of the electric wires including the first electric wire, the second electric wire and the signal electric wires wire as compared to the construction in which a conductor of at least one of the first electric wire or the second electric wire is made of copper or a copper alloy; and
a suppressed outer diameter of the combination of electric wires including the first, second, and signal electric wires as compared to the construction in which a conductor of at least one of the first electric wire or the second electric wire is made of copper or a copper alloy,
wherein the cross-sectional area of the conductor of the first electric wire is set from 0.35 mm² to 2.5 mm²;
and a cross-sectional area of the conductor of the signal electric wire is from 0.13 mm² to 0.35 mm²,
wherein a combination of the first, second and signal electric wires comprising the conductor of the first electric wire having the cross-sectional area set from 0.35 mm² to 2.5 mm² formed of the aluminum electric wire and the conductor of the signal electric wire having the reduced diameter and the cross-sectional area of from 0.13 mm² to 0.35 mm² formed of the copper electric wire comprise the reduced weight and the suppressed outer diameter of the combination of the first, second and signal electric wires as compared to a combination in which a conductor of a first electric wire having a cross sectional areas from 0.35 mm² to 1.25 mm² comprising copper or a copper alloy, and a conductor of a signal electric wire having a cross sectional area from 0.35 mm² to 1.25 mm² comprising copper or a copper alloy.

2. A wire harness comprising:
electric wires each including a conductor;
the electric wires including a first electric wire to be coupled to a power source circuit, a second electric wire to be coupled to a high-current power source circuit or a ground circuit and allowing a current larger than a current of the first electric wire to flow, and a signal electric wire to be coupled to a signal circuit, wherein
the conductor of each of the first electric wire and the second electric wire comprises an aluminum electric wire made of aluminum or an aluminum alloy so as to comprise a reduced weight thereof as compared to a construction in which a conductor of at least one of the first electric wire or the second electric wire is made of copper or a copper alloy; and
the conductor of the signal electric wire comprises a copper electric wire made of copper or a copper alloy comprising a reduced diameter as compared to a construction in which the signal wire comprises an aluminum electric wire, wherein:

a cross-sectional area of the conductor of the first electric wire and a cross-sectional area of the conductor of the second electric wire are set so as to comprise:

an increased conductor resistance to meet a conductor resistance of a copper electric wire;

a reduced weight of a combination of the electric wires including the first electric wire, the second electric wire and the signal electric wire as compared to the construction in which a conductor of at least one of the first electric wire or the second electric wire is made of copper or a copper alloy; and a suppressed outer diameter of the combination of electric wires including the first, second, and signal electric wires as compared to the construction in which a conductor of at least one of the first electric wire or the second electric wire is made of copper or a copper alloy;

the cross-sectional area of the conductor of the first electric wire is set from 0.35 $mm^2$ to 2.5 $mm^2$;

a cross-sectional area of the conductor of the signal electric wire is from 0.13 $mm^2$ to 0.35 $mm^2$; and a combination of the first, second and signal electric wires comprising the conductor of the first electric wire having the cross-sectional area set from 0.35 $mm^2$ to 2.5 $mm^2$ formed of the aluminum electric wire and the conductor of the signal electric wire having the reduced diameter and the cross-sectional area of from 0.13 $mm^2$ to 0.35 $mm^2$ formed of the copper electric wire comprise the reduced weight and the suppressed outer diameter of the combination of the first, second and signal electric wires as compared to a combination in which a conductor of a first electric wire having a cross sectional areas from 0.35 $mm^2$ to 1.25 $mm^2$ comprising copper or a copper alloy, and a conductor of a signal electric wire having a cross sectional area from 0.35 $mm^2$ to 1.25 $mm^2$ comprising copper or a copper alloy.

* * * * *